Figure 1:
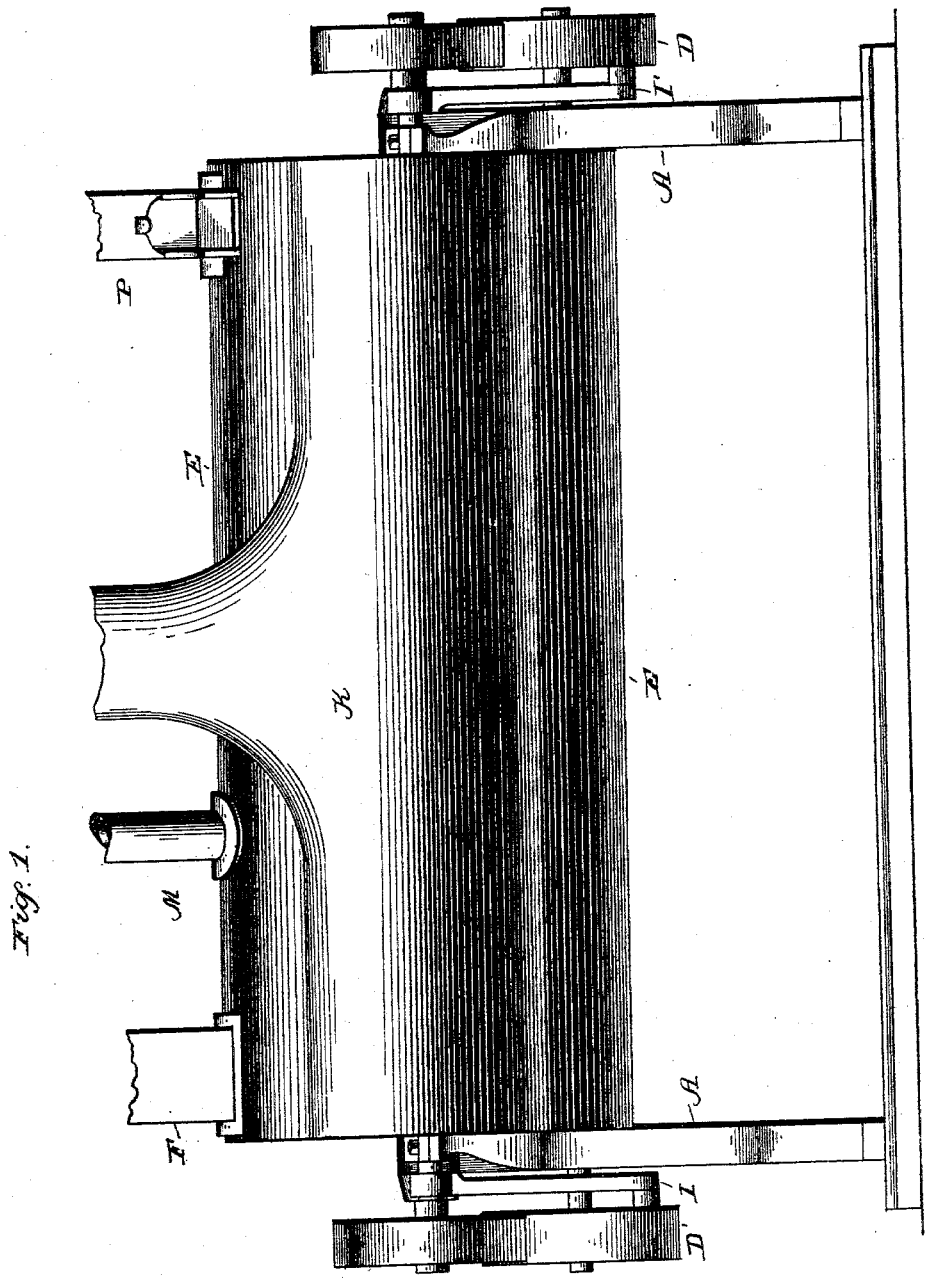

(No Model.) 3 Sheets—Sheet 3.
J. J. FAULKNER.
COTTON SEED DELINTER.

No. 561,660. Patented June 9, 1896.

Witnesses
Victor J. Evans
O E Braithwayt

Inventor
James J. Faulkner
by E M Neable Sons
Attorneys

UNITED STATES PATENT OFFICE.

JAMES J. FAULKNER, OF MEMPHIS, TENNESSEE, ASSIGNOR TO THE STANDARD COTTON SEED COMPANY, OF ARKANSAS.

COTTON-SEED DELINTER.

SPECIFICATION forming part of Letters Patent No. 561,660, dated June 9, 1896.

Application filed April 6, 1896. Serial No. 586,372. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the novel lint-removal device which will be hereinafter fully described, and particularly pointed out in the claims.

The object of my invention is to provide efficient means for securing the removal of the lint, separated from the seed by the action of the abrading-surfaces, from the inclosure in which the abrading action takes place. The removal of the lint from this inclosure in order to be effectual must necessarily take place as rapidly as the lint is scoured from the surface of the seed under treatment, in order that the abrading-surfaces may be kept clean and in condition to offer active scouring-surfaces, and in order that regrinding of the lint which has been separated from the seed may be prevented.

I accomplish the object of my invention by the use of a series of reciprocating saws, stationed in the open mouth of an air-flume and working through spaced openings formed in the delinting-cylinder casing. The saw-teeth on the separate saws are inclined in opposite directions from the center of the saws, in order that such teeth may actively perform their lint-removal action during both periods of their reciprocating movement. The saw-sections are further arc-shaped in my present construction, so that the teeth forming the same will always project into the abrading-inclosure, and doffing-brushes are provided for removing the lint from such saws and for keeping their surfaces clean and ready for active operation. Reciprocating saws have the advantage of not becoming heated in their action, and of not tearing the lint, which they remove from the abrading-inclosure, so that a better quality of lint is obtained by their use than can be obtained by any other of the lint-removal devices with which I am acquainted.

My invention is fully illustrated in the drawings, in which—

Figure 2:
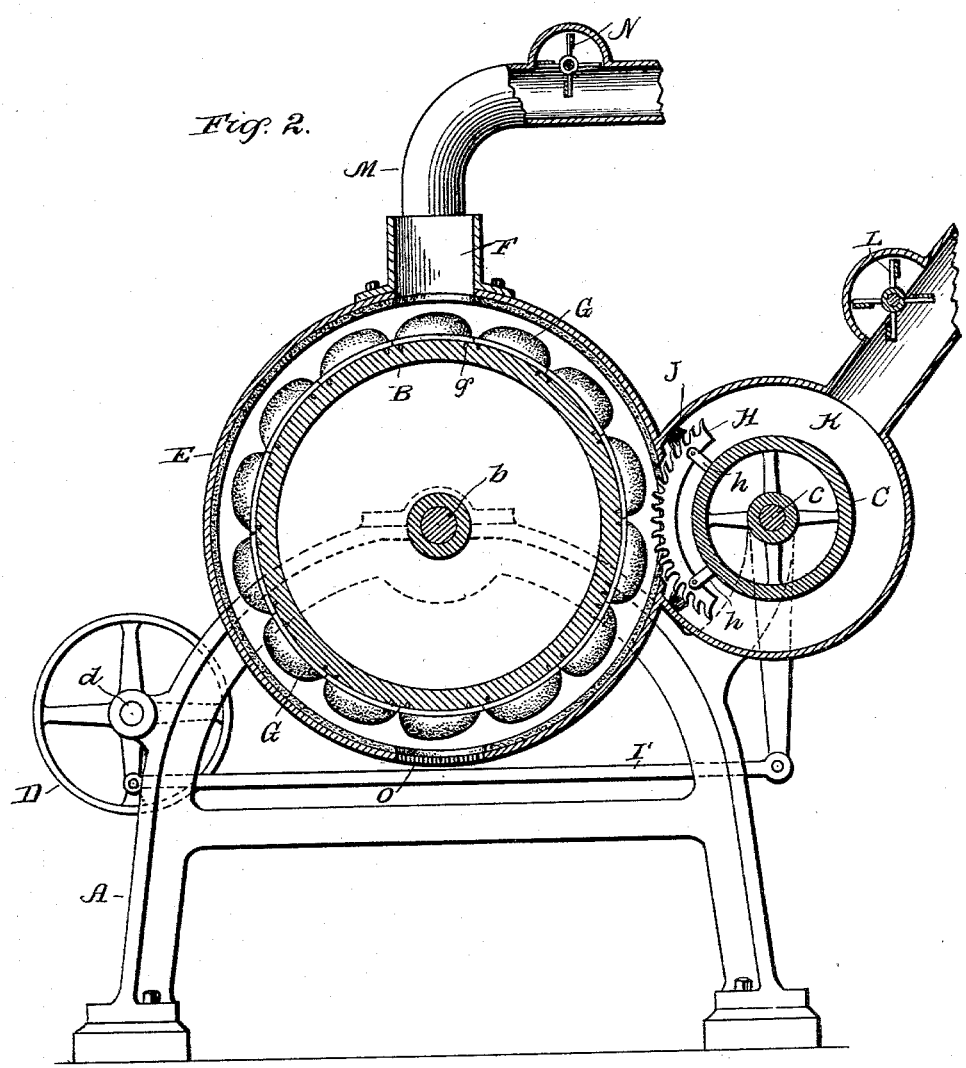
Figure 3:
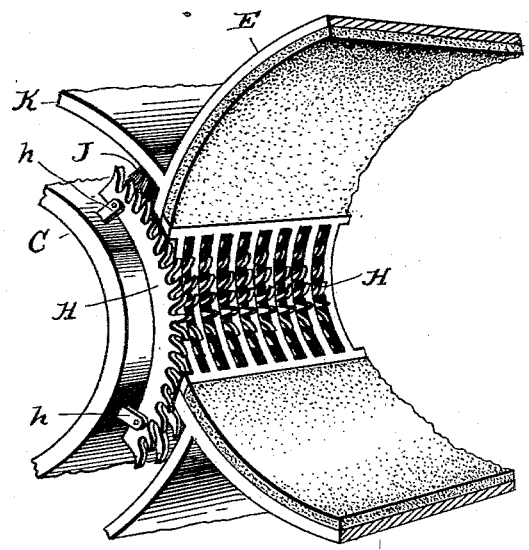

Figure 1 is a side elevation of my machine, showing the lint-removal air-flume as well as the air-supply air-flume. Fig. 2 is a central vertical section of my machine. Fig. 3 is a detail view of a portion of the delinting-cylinder casing, illustrating a few of the lint-removal saws.

Referring to the drawings, A represents the machine-frame. In this frame are formed suitable bearings for the shaft $b$, upon which the delinting-cylinder B is mounted; the shaft $c$, upon which the cylinder C, to which the lint-removal saws are attached, is mounted, and the shaft $d$, upon which the power-wheel D is mounted. The delinting-cylinder casing E is preferably made of iron and coated on its inner surface with an emery lining, according to the process described in my Patent No. 557,065, dated March 24, 1896. It is provided with a seed-supply spout F and with a suitable discharge-opening P.

The abrading-surfaces are formed by the emery lining of the delinting-cylinder casing and by the abrading projections G, which preferably have the form shown in the drawings—*i.e.*, have inclined sides and an inclined upper face, though other forms of blocks may be used if desired.

The lint which is separated from the seed by the action of the abrading-surfaces is removed from the inclosure in which the abrading operation is taking place by the action of the reciprocating saws H. These saws are secured to the surface of the cylinder C by the strips $h$, or in any other suitable manner, and work through spaced openings in the delinter-cylinder casing. A reciprocating movement is given to the saws by the action of the levers I and I' and the power-wheel D. The inclination of the teeth upon the saws varies in different portions of the same. One-half of the saw-teeth are so inclined as to actively remove lint from the abrading-inclosure when the reciprocating movement of such saws is downward, while the remainder of the teeth are oppositely inclined, so as to remove lint from the abrading-inclosure when the saws are moving upward. In this manner lint removal is effected throughout the reciprocating movement of the saws and lint is constantly being removed from the abrading-inclosure. Doffing-brushes J, which may be formed either of bristles or of steel strips fitting close to the saws, serve to remove the lint from the saws and to keep their surfaces constantly clean and in condition for active service. The removal of the lint from the abrading-inclosure is assisted by the action of the exhaust air-current caused to exist in the air-flume K by the action of the exhaust-fan L. The air-flume K incloses the reciprocating saws and the air-current existing therein serves not only to assist the withdrawal of lint from the abrading-inclosure, but to remove the lint which is doffed from the reciprocating saws and convey the same to a distant point of discharge. The space existing between the saw-sections and the surface of the cylinder C assists the action of the air-current in permitting the same to attain full strength.

To facilitate the removal of lint from the abrading-inclosure and to keep the abrading-surfaces as clean and free from lint as possible, I have provided an air-flume M, which is shown in communication with the abrading-inclosure. The air-flume M may extend the entire length of the delinting-cylinder, or it may be a pipe from seven to ten inches in diameter, the latter being the construction I prefer, as in that case the amount of active scouring-surface of the casing is not materially reduced. Air is forced through the air-flume M by the action of the fan N into the abrading-inclosure under pressure, and assists not only in freeing the abrading-surfaces from the lint which naturally gathers on the same at this portion of the action of the machine, but also carries the lint as rapidly as it is detached from the seed to the lint-removal saws, thus materially facilitating the removal of such lint from the machine.

The air-flume M may be stationed at any portion of the machine; but I prefer to station it at the point represented in the drawings, as its action is best effected when so placed.

The dirt which is separated from the seed by the action of the machine is removed from the abrading-inclosure through perforations O formed in the bottom of the delinting-cylinder casing.

The operation of my machine is as follows: The seed, which is fed to the machine through the feed-spout F, is subjected to the action of the abrading-surfaces formed by the projections G on the surface of the delinting-cylinder and the emery lining of the casing. The lint, as rapidly as it is scoured off the seed, is removed from the abrading-inclosure by the action of the reciprocating saws H, such saws actively removing the lint during both directions of their reciprocating movement owing to the opposite inclination of the teeth formed on the same. The lint removal is facilitated by the air-current forced into the abrading-inclosure, under pressure, through the air-flume M. The dirt which is separated from the seed during the course of the delinting operation escapes through the perforations O formed in the casing. The seed is finally discharged from the machine through a suitable discharge-opening P.

Having thus described my invention, what I claim as new, and desire to secure by Letters Patent, is—

1. In a cotton-seed delinter, the combination with a revolving abrading-surface, and a casing therefor having an aperture therein, of a reciprocating saw working through said aperture, and means for operating the same, substantially as described.

2. In a cotton-seed delinter, the combination with a revolving abrading-surface, and a casing therefor having a series of apertures formed on one side thereof, of an air-flume in communication with said apertures, means for producing an outward current of air therein, reciprocating saws working through the apertures in the casing, and means for operating the same, substantially as described.

3. In a cotton-seed delinter, the combination with a revolving abrading-surface, and a casing therefor having a series of apertures formed on one side thereof, of an air-flume in communication with said apertures, means for producing an outward current of air therein, reciprocating saws having oppositely-inclined teeth formed therein working through the apertures in the casing, and means for operating the same, substantially as described.

4. In a cotton-seed delinter, the combination with a revolving abrading-surface, and a casing therefor having a series of apertures formed on one side thereof, of an air-flume in communication with said apertures, means for producing an outward current of air therein, arc-shaped reciprocating saws working through the apertures in the casing, a support therefor, and means for operating the same, substantially as described.

5. In a cotton-seed delinter, the combination with a revolving abrading-surface, and a casing therefor having a series of apertures formed on one side thereof, of an air-flume in communication with said apertures, means for producing an outward current of air therein, the arc-shaped saws H, the strips $h$, the cylinder C, the levers I and I', and the power-wheel D, substantially as described.

In testimony whereof I affix my signature in presence of two witnesses.

JAMES J. FAULKNER.

Witnesses:
J. F. HUDSPETH,
HUGH B. CALLEN.